United States Patent [19]
Quigley et al.

[11] Patent Number: 5,688,571
[45] Date of Patent: Nov. 18, 1997

[54] COMPOSITE TUBULAR MEMBER WITH INTERNAL REINFORCEMENT AND METHOD

[75] Inventors: Peter A. Quigley, Pocasset; Stephen C. Nolet, Franklin, both of Mass.

[73] Assignee: Composite Development Corporation, West Wareham, Mass.

[21] Appl. No.: 597,088

[22] Filed: Feb. 5, 1996

Related U.S. Application Data

[63] Continuation-in-part of Ser. No. 178,664, Jan. 7, 1994, Pat. No. 5,556,677, and Ser. No. 191,856, Feb. 3, 1994, Pat. No. 5,549,947.

[60] Provisional application No. 60/001,470 Jul. 17, 1995.

[51] Int. Cl.⁶ .............................. B29D 22/00; B32B 1/08
[52] U.S. Cl. ................. 428/36.1; 428/36.2; 428/36.3; 428/36.91; 428/120
[58] Field of Search .............................. 428/36.1, 36.2, 428/36.3, 36.91, 120

[56] References Cited

U.S. PATENT DOCUMENTS

| | | | |
|---|---|---|---|
| Re. 29,112 | 1/1977 | Carter | 156/156 |
| Re. 30,489 | 1/1981 | Abbott | 156/175 |
| 2,602,766 | 7/1952 | Francis | 154/91 |
| 3,007,497 | 11/1961 | Shobert | 138/125 |
| 3,080,893 | 3/1963 | Craycraft | 138/141 |
| 3,256,125 | 6/1966 | Tyler | 156/184 |

(List continued on next page.)

FOREIGN PATENT DOCUMENTS

| | | |
|---|---|---|
| 2105797 | 11/1993 | Canada . |
| 0 470 896 A2 | 2/1992 | European Pat. Off. . |
| 2 501 579 | 9/1982 | France . |
| 2 516 859 | 5/1983 | France . |
| 1 704 925 | 7/1971 | Germany . |

OTHER PUBLICATIONS

Brochure "Tygon Tubing", Bulletin T–104, Norton Performance Plastics, Akron, Ohio no date.
Brochure "A New Generation of High–Strength Engineered, Composite Structural Shapes. The technology exists today at Alcoa/Goldsworthy Engineering", ALCOA Goldsworthy Engineering no date.
Brochure "New Developments. Thermoplastic Pultrusions, Inc. capabilities included" no date.
Brochure "The Shape of Things to Come. Advanced Production Systems for Composites" Goldsworthy Engineering, Inc. no date.
European Search Report; Application No. EP 90 91 1104; Jan. 28, 1993.

(List continued on next page.)

*Primary Examiner*—Terrel Morris
*Attorney, Agent, or Firm*—Lahive & Cockfield, LLP

[57] ABSTRACT

An axially extending composite tubular member having a plurality of plies and having primary bending stiffness along a longitudinal axis, has at least one interior ply having a matrix material and a first fiber component with fibers oriented at an angle relative to the longitudinal axis of between thirty degrees and sixty degrees, and more particularly between forty degrees and fifty degrees. An internal weblike reinforcement spans across the tubular interior of the member between and is secured to two spaced apart wall portions. The first fiber component provides significant torsional stiffness to the composite member and the internal weblike reinforcement provides significant impact resistance to the composite member. A method of fabricating such an axially extending composite tubular member includes the steps of forming first and second fabric strips into axially extending side-by-side closed tubes, the abutting walls of which form the internal weblike reinforcement, and forming a fibrous fabric into a longitudinally extending ply enclosing the first and second plies and having fibers that constitute the first fiber component of said interior ply.

3 Claims, 1 Drawing Sheet

U.S. PATENT DOCUMENTS

| | | | |
|---|---|---|---|
| 3,489,636 | 1/1970 | Wilson | 156/426 |
| 3,561,493 | 2/1971 | Maillard | 138/141 |
| 3,762,986 | 10/1973 | Bhuta et al. | 161/227 |
| 3,896,858 | 7/1975 | Whatley | 138/130 |
| 4,023,801 | 5/1977 | VanAuken | 273/80 |
| 4,058,167 | 11/1977 | Granek et al. | 169/61 |
| 4,171,626 | 10/1979 | Yates et al. | 64/1 |
| 4,248,062 | 2/1981 | McLain et al. | 64/1 |
| 4,268,561 | 5/1981 | Thompson et al. | 428/111 |
| 4,612,241 | 9/1986 | Howard, Jr. | 428/294 |
| 4,625,671 | 12/1986 | Nishimura | 114/103 |
| 4,657,795 | 4/1987 | Foret | 428/36 |
| 4,668,318 | 5/1987 | Piccoli et al. | 156/149 |
| 4,699,178 | 10/1987 | Washkewicz et al. | 138/125 |
| 4,716,072 | 12/1987 | Kim | 428/212 |
| 4,759,147 | 7/1988 | Pirazzini | 43/18.5 |
| 4,791,965 | 12/1988 | Wynn | 138/146 |
| 4,840,846 | 6/1989 | Ejima et al. | 428/373 |
| 4,900,048 | 2/1990 | Derujinsky | 280/281.1 |
| 4,968,545 | 11/1990 | Fellman et al. | 428/36.1 |
| 5,048,441 | 9/1991 | Quigley | 114/90 |
| 5,188,872 | 2/1993 | Quigley | 428/36.2 |
| 5,196,255 | 3/1993 | Cohen | 428/36.9 |
| 5,332,606 | 7/1994 | Pearce | 428/36.3 |
| 5,366,773 | 11/1994 | Schroll et al. | 428/36.1 |
| 5,507,320 | 4/1996 | Plumley | 428/36.2 |
| 5,549,947 | 8/1996 | Quigley et al. | 428/36.2 |
| 5,556,677 | 9/1996 | Quigley et al. | 428/36.2 |

OTHER PUBLICATIONS

European Search Report; Application No. EP 95 10 0159; Nov. 9, 1995.

R. Monks, (1992) "Two Trends in Composites", *Plastic Technology* 38(3):40–45.

TPI Tips, "News and Tips for Pultruded Thermoplastic Composites", Thermoplastic Pultrusions, Inc. V.1–No.2, Nov. 1991 (1 page).

TPI Tips, "News and Tips for Pultruded Thermoplastic Composites", Thermoplastic Pultrusions, Inc. V.2–No.3, May 1992 (1 page).

TPI Tips, "News and Tips for Pultruded Thermoplastic Composites", Thermoplastic Pultrusions, Inc. V.2–No.4, Jul. 1992 (1 page).

TPI Tips, "News and Tips for Pultruded Thermoplastic Composites", Thermoplastic Pultrusions, Inc. V.2–No.5, Sep. 1992 (1 page).

International Search Report dated Sep. 10, 1996 PCT/US96/11718.

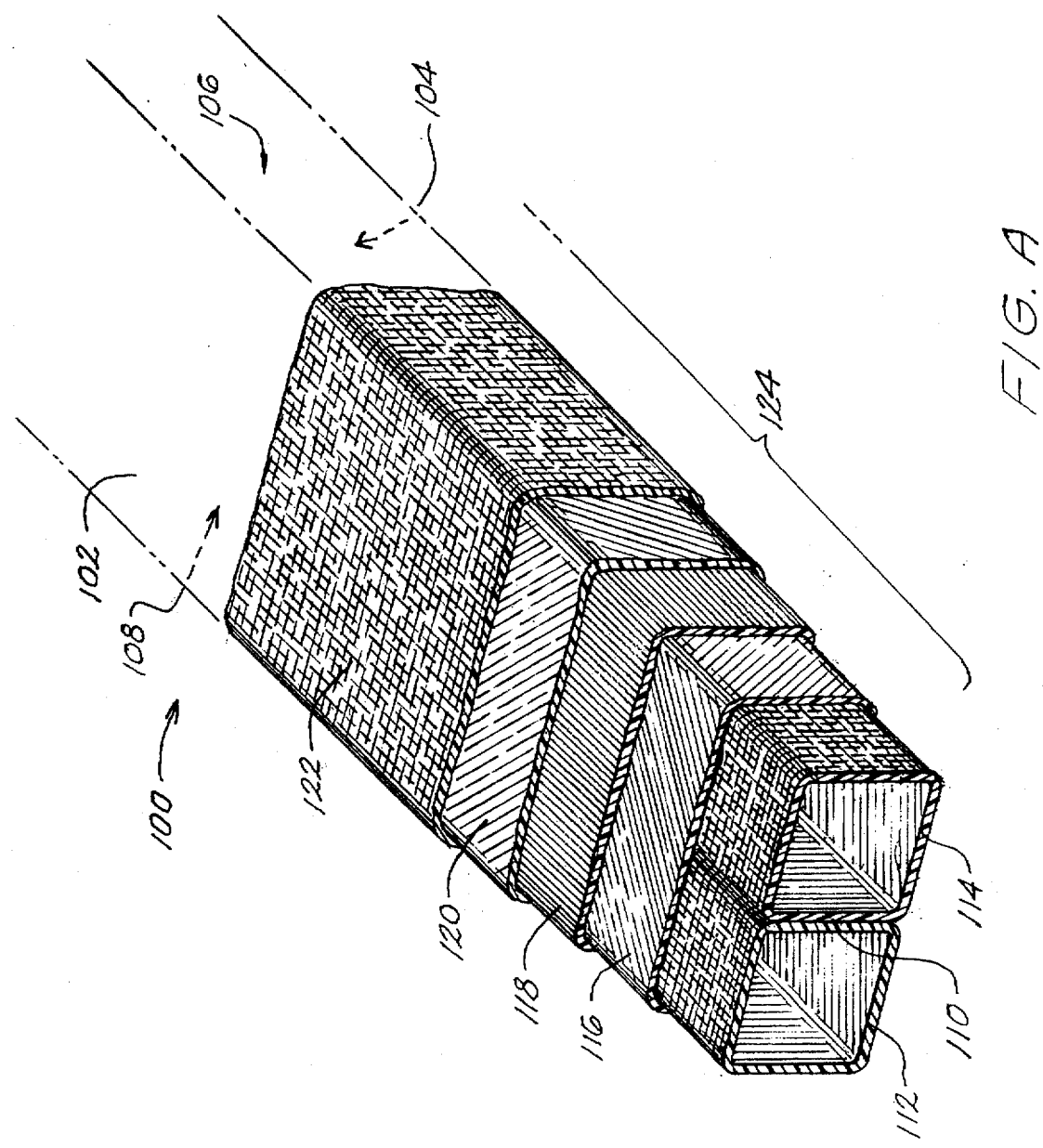
FIG. A

COMPOSITE TUBULAR MEMBER WITH INTERNAL REINFORCEMENT AND METHOD

CROSS-REFERENCE TO RELATED APPLICATIONS

This application is a continuation-in-part of the following commonly-owned and non-provisional and provisional patent applications: U.S. Ser. No. 08/178,664, filed on Jan. 7, 1994, now U.S. Pat. No. 5,556,677, U.S. Ser. No. 08/191,856, filed on Feb. 3, 1994, now U.S. Pat. No. 5,549,947; U.S. Ser. No. 60/001,470, filed on Jul. 17, 1995.

The disclosure of the last of these applications, namely provisional patent application Ser. No. 60/001,470, is incorporated by reference herein.

SUMMARY OF THE INVENTION

Tubular materials having a resin-fiber composite construction have improvements in durability, and particularly in impact strength, and are suited for relatively low cost and continuous manufacture, when constructed with internal reinforcement.

The tubular members of the invention have one or more plies of fibers. In one practice, the multiple-ply composite members are constructed according to manufacturing methods described in the commonly-assigned U.S. patent application Ser. No. 08/191,856 filed 3 Feb. 1994 now U.S. Pat. No. 5,549,947 and which is incorporated herein by reference.

The internal reinforcement is applicable in structures having any of various cross sections, examples of which include a polygonal cross section and a circular cross section. Examples of such reinforcement include an interior rib extending along the length of the member, either essentially parallel to the axis or length of the member or selectively angled, e.g., helical, with regard to the axis of a straight member. Such a rib is preferably provided on each of two opposed walls. Another example of such internal reinforcement is an interior web, or an axially spaced succession of interior braces, spanning between opposed walls or between adjacent walls. For example, an interior web or brace in a composite tubular member according to one embodiment of the invention and having a circular or elliptical cross section can follow the path of a chord extending between two locations spaced apart around the circumference of the composite member, when viewed in cross section. Correspondingly, in a structure having a polygonal cross section, the internal web or brace extends between adjacent walls. Further examples include such braces or webs extending between opposed walls or wall portions including along the path of a diameter of a member having a circular or elliptical cross section.

The interior reinforcement can extend along the full length of the member or along only part of the length. The latter may be preferred, for example, to decrease weight.

In one preferred practice, the internal reinforcement is formed during the initial pultrusion fabrication of the composite member and accordingly is continuous along the length of the member, or at least along a selected portion thereof. Where such an internal reinforcing web is formed continuously along the length of a member, it can subsequently be removed, as by machining, from one or more selected portions of the length of the member. This may be desired to reduce the weight of the member.

A further alternative is to fabricate the composite member and add internal reinforcement, by inserting a preformed internal reinforcement element. The internal reinforcement element preferably is added prior to final curing of the polymers of the composite member and of the reinforcement element to ensure a solid attachment of the internal reinforcement member element to the composite member. In accordance with another method of fabrication, the composite member and the internal reinforcing element are formed concurrently as part of a resin transfer or compression molding process. This fabrication method provides a system capable of forming a composite member integral with an internal reinforcing element both having selective characteristics along the length of the member.

BRIEF DESCRIPTION OF THE DRAWING

FIG. A shows a transverse cross section and longitudinal fragment of a composite tubular member according to one practice of the invention.

DESCRIPTION OF THE ILLUSTRATED EMBODIMENTS

FIG. A shows a transverse cross section and longitudinal fragment of a composite tubular member 100 according to one preferred practice of the invention. The illustrated member 100 has a rectangular cross section with two wide opposed walls 102 and 104 and two narrow opposed walls 106 and 108. The tubular member 100 can be constructed essentially as described in Attachment B to form, for example, the shaft of a hockey stick or of a lacrosse stick. Each wall 102, 104, 106 and 108 of the illustrated member 100 has generally uniform thickness along the length of the member and the four walls are of essentially the same thickness. Thus, the member 100 as illustrated FIG. A is preferably continuous along at least a selected length, i.e., has the same cross section at successive locations along that selected length. This continuous cross sectional configuration facilitates manufacture, for example with pultrusion procedures as described in Attachment B.

The member 100 further has, as also shown in FIG. A, internal reinforcement in the form of a web 110 that spans between and is joined solidly to the opposed wider walls 102 and 104 of the member. The reinforcing web 110 is continuous along at least a selected portion of the length of the member 100.

In a preferred embodiment of the member 100, as shown, two elongated strips of fabric 112 and 114 are formed into side-by-side closed quadrilateral tubes. The abutting walls of the two tubes, as formed by the fabric, form the web 110 of the member 100.

An elongated strip of fabric 116 is then formed into a closed tube enclosing the two side-by-side tubes formed by the fabrics 112 and 114.

A ply 118 of axially-extending fibers is then disposed over the layer formed by the fabric 116.

Another elongated strip of fabric 120 is formed into a closed tube enclosing the fiber ply 118 (and the structure therein formed by the fabrics 116, 114 and 112). An outer ply of the structural member is formed by an elongated strip of fabric 122, also formed into a tubular enclosure.

The foregoing assemblage of fiber plies is impregnated with resin 124, typically an epoxy resin, and the resultant composite is cured.

The foregoing form of fabricating the member 100 can advantageously be practiced in a pultrusion system with a fixed, i.e., stationary, mandrel on which the fabric arid fiber layers are formed, and within an outer die-like forming member.

In one preferred embodiment of the member 100, each fabric 112 and 114 is a preformed fabric having fibers, typically of fiberglass, carbon or aramid, and oriented at zero degrees and at ninety degrees relative to the longitudinal length of the member 100. Such a fabric commonly has a woven structure.

The fabric 116 in this embodiment is a preformed fabric, preferably non-woven, i.e., of stitched or knitted structure, with fibers oriented at ±forty-five degrees relative to the longitudinal axis of the member 100. Alternatively, braided or woven fabrics oriented at ±forty-five degrees relative to the longitudinal axis of the member 100 may be used. The fabric 116 can be, for example, of glass, carbon or aramid fibers.

The fibers in the ply 118 can be of carbon or of glass, or can be a hybrid, i.e., a combination of glass and of carbon, by way of example.

The fabric 120 in the embodiment is a preformed fabric of glass and/or carbon, preferably of non-woven structure and having fibers oriented at ±forty-five degrees relative to the member longitudinal axis. The fabric 122 that forms the illustrated outer ply of the member 100 is preferably a preformed fabric typically of woven structure, with fibers oriented at zero and at ninety degrees relative to the longitudinal axis of the member 100.

The primary function of each layer in the member 100 is that the innermost fabrics 112 and 114 provide internal impact resistance, particularly by forming the internal reinforcing web 110. Each fabric 116 and fabric 118 forms a ply providing torsional stiffness to the member 100. The axially-oriented fibers in the ply 118 provide bending load strength, i.e., axial stiffness to the member 100. The fabric 122 provides external wear resistance to the member 100.

The member 100 can be further formed, prior to impregnation with resin and prior to curing, with one or more light gauze or surface veil plies of preformed gauze or veil-like fiber that is highly resin-absorbent. These surface gauze or veil plies enhance the abrasion resistance of the member 100 and can provide an attractive surface finish.

More generally, the invention can be practiced, in one instance, with fibers oriented at angles other than those for the particular embodiment described above. For example, the fabrics 112 and 114 can be arranged with the fibers oriented generally between ±30° and between 60° and 120° relative to the longitudinal axis of the member 100. More preferred ranges of fiber angles for these fabrics are ±15° and between 75° and 115° relative to that axis.

Similarly, each fabric 116 and 120 can be arranged with fibers oriented between ±30° and ±60° relative to the longitudinal axis of the member 100. More preferred ranges of the fiber angles for each of these fabrics are between ±40° and ±50°. Further, in most practices of the invention, the two sets of fibers of each fabric—which generally are orthogonal to each other within the fabric—are oriented on the member symmetrically relative to the longitudinal axis of the member.

The longitudinal seams of the different strips of fabric that form the several plies of the member 100, as described above, are preferably formed at different, spaced apart locations in the member 100. For example, the longitudinal seams in the tubes formed by the fabrics 112 and 114 can be disposed along opposed member walls 106 and 108. The longitudinal seams of the fabrics 116, 120 and 122 can also be located along different walls of the member 100.

Features attained with a composite member having the structure described and shown are that it has high bending strength and stiffness, and high torsional rigidity. It also has, through the wall thickness, durability and impact resistance. Further by way of illustrative example and without limitation, a member 100 as described above and suited for use as a hockey stick shaft can have a web thickness of 0.034 inch and a thickness in each wall 102, 104, 106 and 108 of 0.082 inch.

Having described the invention, what is claimed as new is:

1. An axially extending composite tubular member with two spaced apart wall portions having a plurality of plies, each ply having a matrix material and a fiber component, and said member having primary bending stiffness along a longitudinal axis, and comprising at least one ply having a first fiber component with fibers oriented at an angle relative to said longitudinal axis of between thirty degrees and sixty degrees, and an internal reinforcement spanning across the tubular interior of the member between and secured to the two spaced apart wall portions, and wherein said first fiber component provides significant torsional stiffness to the composite member and said internal reinforcement provides significant impact resistance to the composite member.

2. An axially extending composite tubular member according to claim 1, and comprising first and second fabric strips, formed into axially extending side-by-side closed tubes, the abutting walls of which form said internal reinforcement, and a fibrous fabric, formed into a longitudinally extending ply enclosing said first and second fabric strips and having fibers that constitute said first fiber component of said ply.

3. An axially extending composite tubular member according to claim 1 wherein said first fiber component includes fibers oriented at an angle relative to said longitudinal axis of between forty degrees and fifty degrees.

* * * * *